(12) United States Patent
Kim et al.

(10) Patent No.: US 11,476,458 B2
(45) Date of Patent: Oct. 18, 2022

(54) CATHODE FOR LITHIUM SECONDARY BATTERIES AND METHOD OF MANUFACTURING THE SAME

(71) Applicant: LG CHEM, LTD., Seoul (KR)

(72) Inventors: Yun Kyoung Kim, Daejeon (KR); Dongwook Koh, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 261 days.

(21) Appl. No.: 16/641,103

(22) PCT Filed: Oct. 23, 2018

(86) PCT No.: PCT/KR2018/012532
§ 371 (c)(1),
(2) Date: Feb. 21, 2020

(87) PCT Pub. No.: WO2019/098550
PCT Pub. Date: May 23, 2019

(65) Prior Publication Data
US 2020/0350570 A1    Nov. 5, 2020

(30) Foreign Application Priority Data
Nov. 16, 2017    (KR) .................. 10-2017-0153234

(51) Int. Cl.
*H01M 4/38*    (2006.01)
*H01M 4/04*    (2006.01)
(Continued)

(52) U.S. Cl.
CPC ........... *H01M 4/38* (2013.01); *H01M 4/0404* (2013.01); *H01M 4/366* (2013.01); *H01M 4/623* (2013.01);
(Continued)

(58) Field of Classification Search
CPC ........... H01M 10/052; H01M 10/0525; H01M 10/0565; H01M 2004/028;
(Continued)

(56) References Cited

U.S. PATENT DOCUMENTS

2002/0015893 A1    2/2002 Noh
2003/0059681 A1    3/2003 Noh
(Continued)

FOREIGN PATENT DOCUMENTS

CN    1324123 A    11/2001
CN    1407016 A    4/2003
(Continued)

OTHER PUBLICATIONS

Machine Translation KR101346414B1 (Year: 2014).*
(Continued)

*Primary Examiner* — Victoria H Lynch
(74) *Attorney, Agent, or Firm* — Birch, Stewart, Kolasch & Birch, LLP

(57) ABSTRACT

A cathode for lithium secondary batteries including a gel polymer electrolyte coating layer formed on a cathode active material layer of a lithium secondary battery, and more particularly, a cathode having a novel structure capable of solving problems caused due to lithium polysulfides, the problems being caused in conventional lithium secondary batteries, and a lithium secondary battery including the same and method for preparing the same.

11 Claims, 6 Drawing Sheets

(51) Int. Cl.
*H01M 4/36* (2006.01)
*H01M 4/62* (2006.01)
*H01M 10/0525* (2010.01)
*H01M 10/0565* (2010.01)

(52) U.S. Cl.
CPC ... *H01M 10/0525* (2013.01); *H01M 10/0565* (2013.01); *H01M 2300/0082* (2013.01); *H01M 2300/0085* (2013.01)

(58) Field of Classification Search
CPC . H01M 2300/0082; H01M 2300/0085; H01M 4/0404; H01M 4/13; H01M 4/139; H01M 4/366; H01M 4/38; H01M 4/382; H01M 4/623; Y02E 60/10
See application file for complete search history.

(56) References Cited

U.S. PATENT DOCUMENTS

| | | |
|---|---|---|
| 2004/0029014 A1 | 2/2004 | Hwang et al. |
| 2005/0175903 A1 | 8/2005 | Kim et al. |
| 2014/0295263 A1 | 10/2014 | Iwama et al. |
| 2017/0263978 A1 | 9/2017 | Koh et al. |
| 2017/0309956 A1 | 10/2017 | Park et al. |

FOREIGN PATENT DOCUMENTS

| | | |
|---|---|---|
| CN | 107078344 A | 8/2017 |
| JP | 2003-151633 A | 5/2003 |
| JP | 2005-79096 A | 3/2005 |
| JP | 2014-89834 A | 5/2014 |
| JP | 2014-191912 A | 10/2014 |
| JP | 2017-530533 A | 10/2017 |
| KR | 10-2001-0104541 A | 11/2001 |
| KR | 10-2003-0015709 A | 2/2003 |
| KR | 10-0454030 B1 | 10/2004 |
| KR | 10-2005-0022616 A | 3/2005 |
| KR | 10-2006-0042326 A | 5/2006 |
| KR | 10-1346414 B1 | 1/2014 |
| KR | 10-2014-0089450 A | 7/2014 |
| KR | 10-2016-0040113 A | 4/2016 |
| KR | 10-2016-0051652 A | 5/2016 |
| KR | 10-2017-0058344 A | 5/2017 |
| KR | 10-2018-0112506 A | 10/2018 |
| WO | WO 2006/052082 A1 | 5/2006 |

OTHER PUBLICATIONS

Machine Translation KR20140089450A (Year: 2014).*
"Coating", Wikipedia, the Free Encyclopedia, URL:https://en.wikipedia.org/w/index.php?title=Coating&oldid=502720949, Jul. 17, 2012, pp. 1-5.
Extended European Search Report for European Application No. 18877560.5, dated Jul. 14, 2020.
International Search Report (PCT/ISA/210) issued in PCT/KR2018/012532, dated Apr. 19, 2019.

* cited by examiner

[Figure 1]
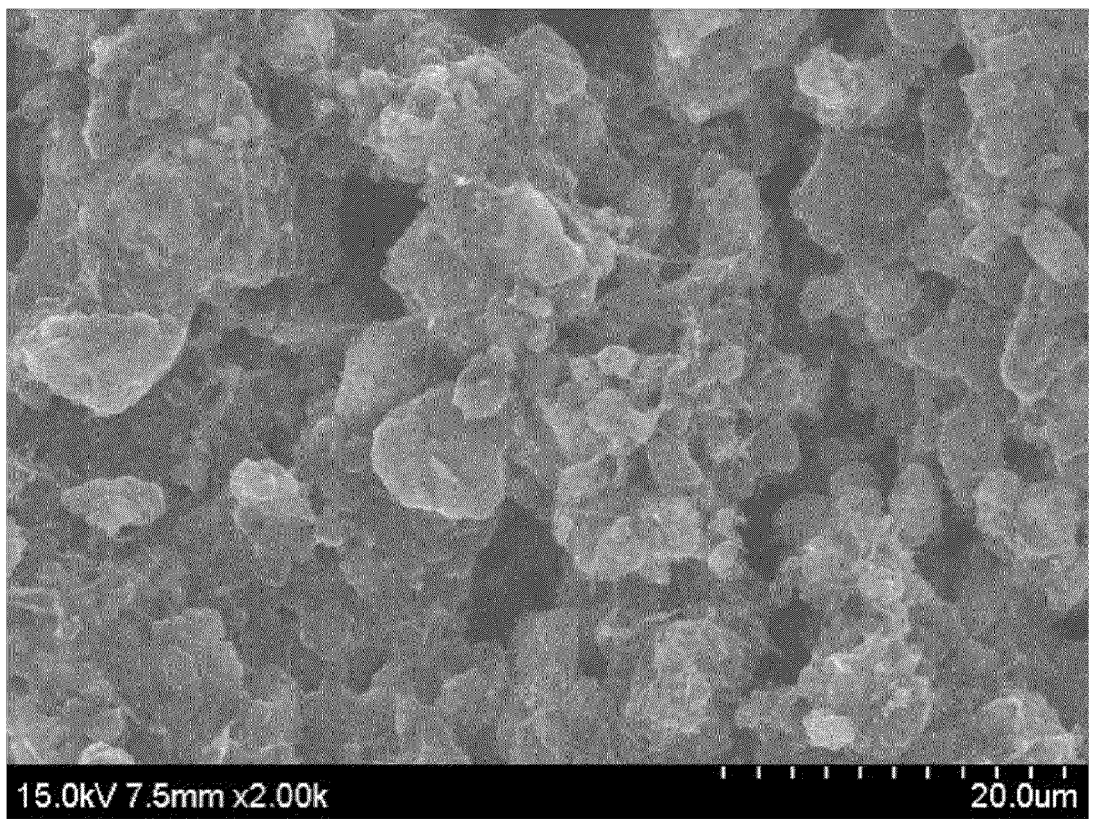

[Figure 2]
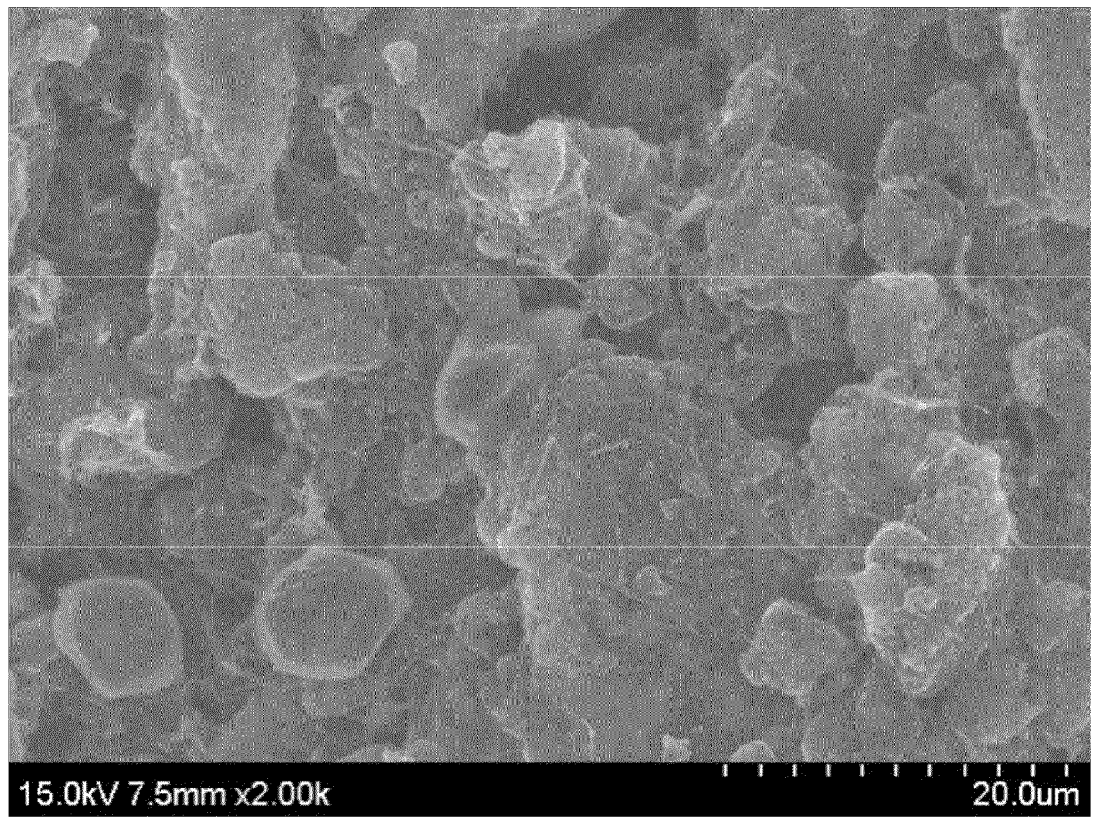

【Figure 3】
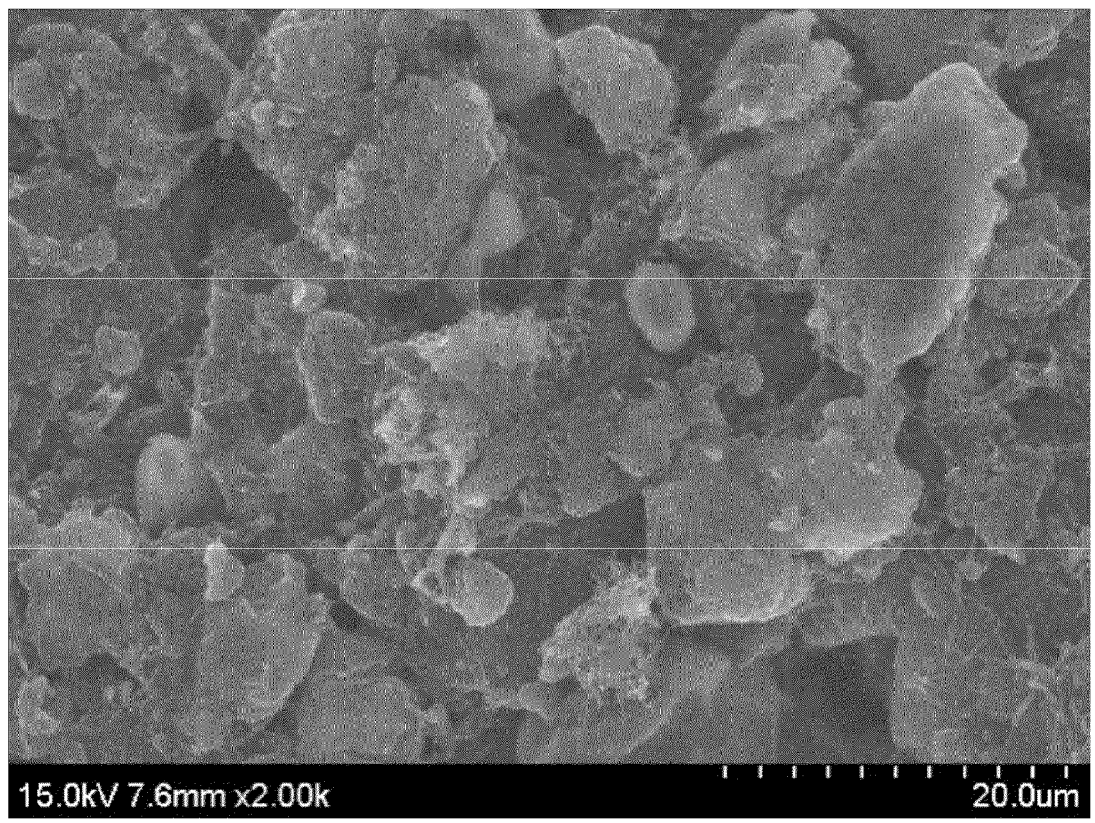
【Figure 4】
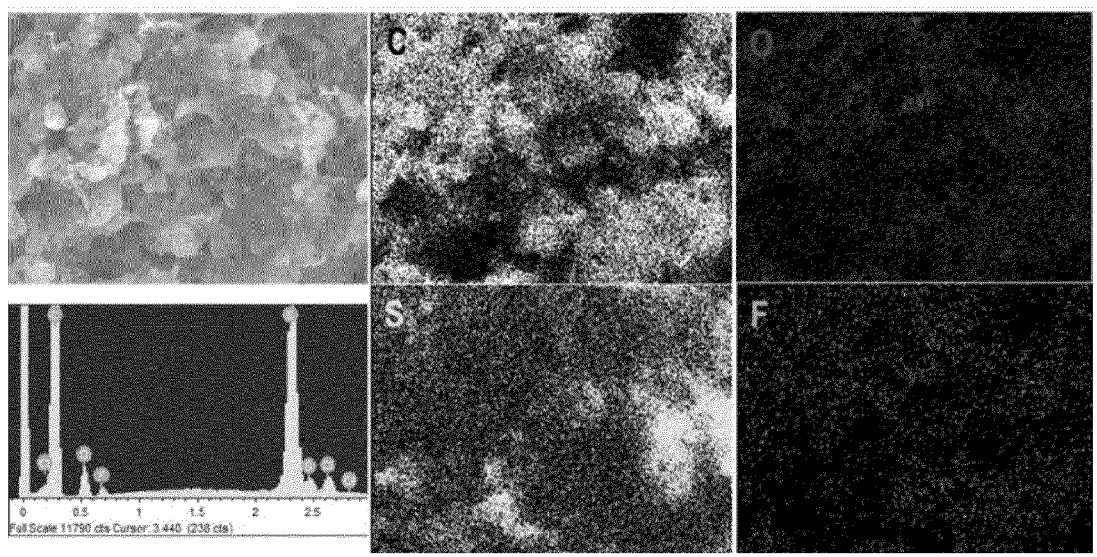

【Figure 5】
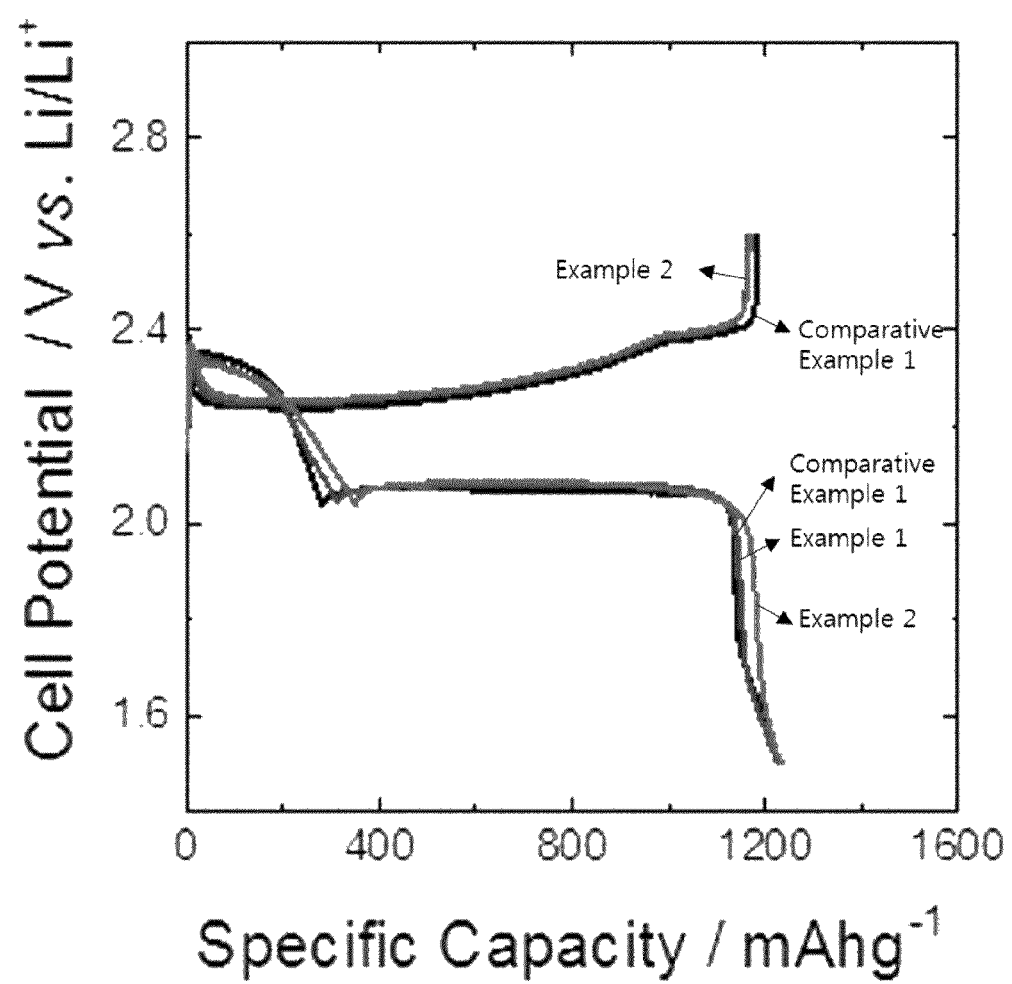

【Figure 6】
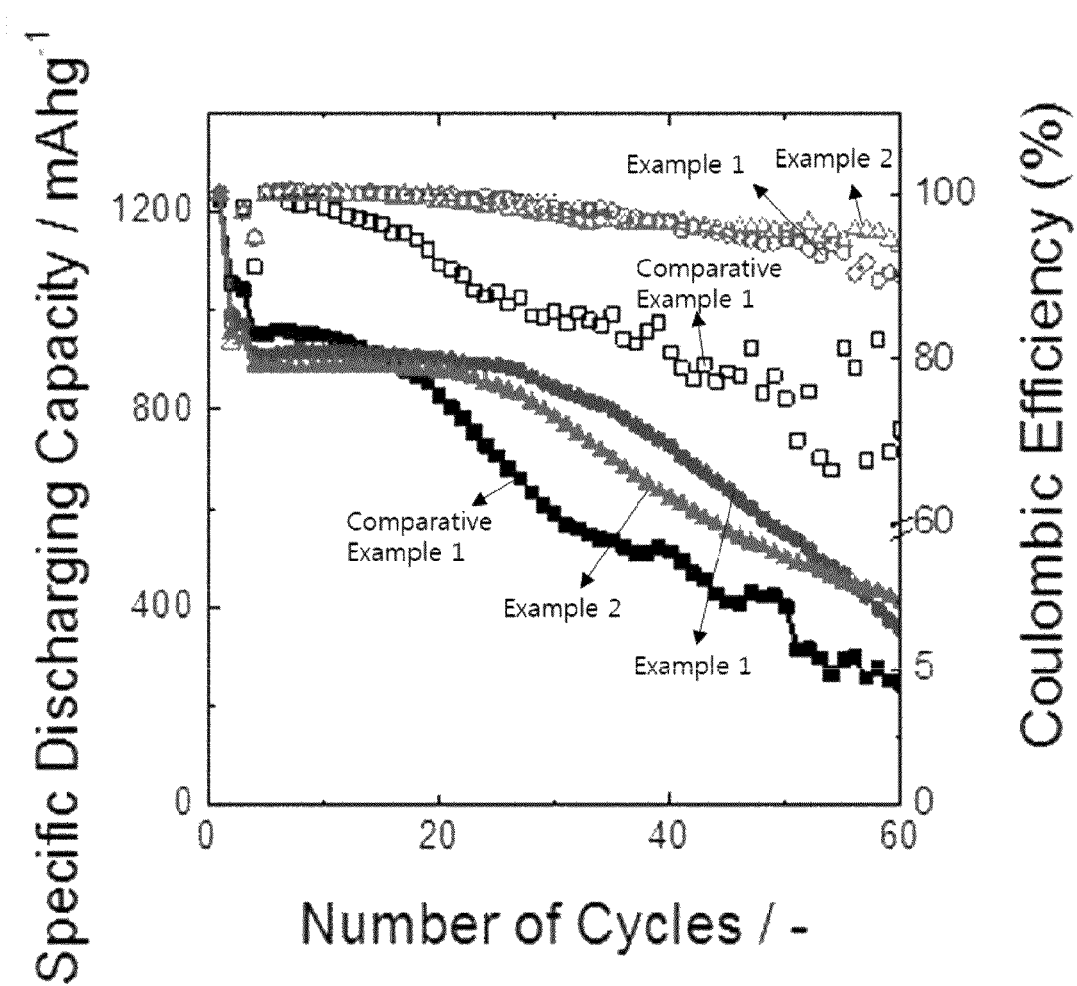

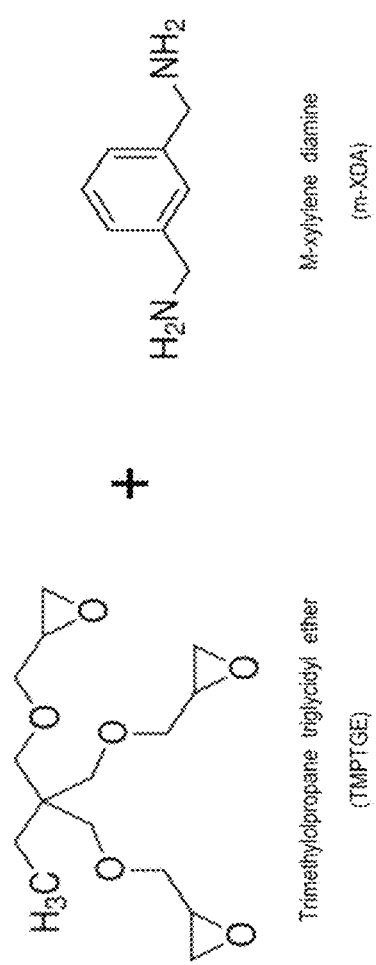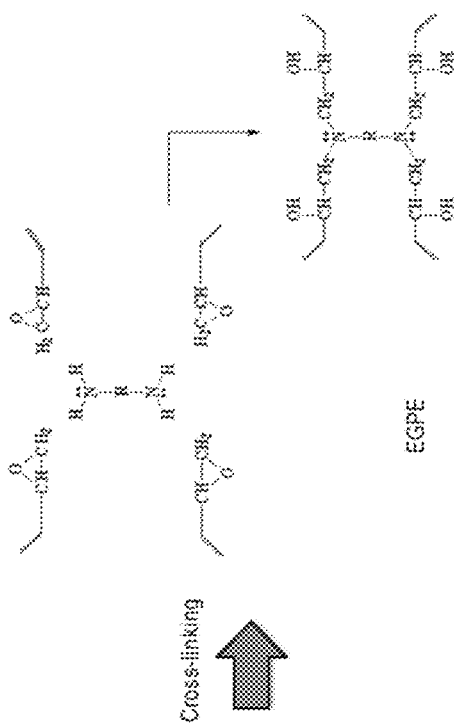
FIG. 7

CATHODE FOR LITHIUM SECONDARY BATTERIES AND METHOD OF MANUFACTURING THE SAME

TECHNICAL FIELD

This application claims priority to Korean Patent Application No. 10-2017-0153234 filed on Nov. 16, 2017 in the Korean Intellectual Property Office (KIPO), the entire contents of which are hereby incorporated by reference.

The present invention relates to a cathode for lithium secondary batteries capable of solving problems caused due to lithium polysulfides and a method of manufacturing the same.

BACKGROUND ART

In recent years, the trend towards small lightweight designs of electronic products, electronic devices, communication devices, and the like has advanced rapidly, and there is also an increasing demand for performance improvement of secondary batteries used as power sources for electric cars as a great need for these products has emerged due to the environmental issues. Among these, the lithium secondary batteries have come into the spotlight as high-performance batteries because they have a high energy density and a high standard electrode potential.

In particular, a lithium-sulfur (Li—S) battery is a secondary battery in which a sulfur-based material having a sulfur-sulfur bond (S—S bond) is used as a cathode active material and a lithium metal is used as an anode active material. Sulfur that is a main material of the cathode active material has advantages in that it is very rich in resources, shows no toxicity, and has a low weight per atom. Also, because the lithium-sulfur battery has a theoretical discharge capacity of 1,675 mAh/g-sulfur and a theoretical energy density of 2,600 Wh/kg, the values of which are significantly higher than the theoretical energy densities (a Ni-MH battery: 450 Wh/kg, a Li—FeS battery: 480 Wh/kg, a Li—MnO$_2$ battery: 1,000 Wh/kg, and a Na—S battery: 800 Wh/kg) of other battery systems which are currently being studied, the lithium-sulfur battery is one of the most promising batteries which are currently being developed.

During the discharge response of the lithium-sulfur battery, an oxidation reaction of lithium occurs in an anode, and a reduction reaction of sulfur occurs in a cathode. In the lithium-sulfur battery, lithium polysulfides (Li$_2$S$_x$ where x=2 to 8) are generated during a discharge process. Such lithium polysulfides are dissolved in an electrolyte and diffused into an anode, thereby causing various side reactions and also reducing the capacity of sulfur participating in an electrochemical reaction. Also, the lithium polysulfides cause a shuttle reaction during the discharge process, resulting in highly degraded charge/discharge efficiency.

To solve the above problems, a method of adding an additive having a property of adsorbing sulfur has been proposed. However, because this method causes a problem regarding degradation of batteries, additional side reactions of the batteries have emerged as new problems. Therefore, a method of adding a metal chalcogenide or alumina or coating surface with an oxycarbonate, and the like in order to delay leakage of a cathode active material, that is, sulfur has been proposed. However, such a method has drawbacks in that sulfur is lost during a treatment process or this process is also complicated, and an amount (a loading amount) of sulfur added as the active material is limited.

Accordingly, to commercialize the lithium-sulfur batteries, the lithium polysulfide-related problems are the first ones to be solved.

PRIOR-ART DOCUMENTS

Patent Documents

Patent Document 1: Registered Korean Patent No. 10-0502357 (Jul. 20, 2005), "Positive Electrode Having Polymer Film and Lithium-Sulfur Battery Employing the Positive Electrode"

Patent Document 2: Registered Korean Patent No. 10-0454030 (Oct. 20, 2004), "Positive Electrode for Lithium-Sulfur Battery, Method of Preparing Same, and Lithium-Sulfur Battery Comprising Same"

DISCLOSURE

Technical Problem

Accordingly, to solve the problems regarding the elution of lithium polysulfides generated at a side of a cathode of a lithium secondary battery according to the present invention and suppress side reactions with an electrolyte solution, the present inventors have applied a novel structure of a gel polymer electrolyte coating layer to a surface of a cathode, and found that the above problems can be solved to improved battery performance of the lithium secondary battery. Therefore, the present invention has been completed based on these facts.

Therefore, an object of the present invention is to provide a cathode for lithium secondary batteries capable of solving the problems caused by lithium polysulfides.

Another object of the present invention is to provide a lithium secondary battery which comprises the cathode, and thus has improved battery performance.

Technical Solution

To solve the above problems, according to one aspect of the present invention, there is provided a cathode for lithium secondary batteries, which comprises:

a current collector;

a cathode active material layer formed on at least one surface of the current collector; and a gel polymer electrolyte coating layer formed on a surface of the cathode active material layer opposite the current collector, wherein the cathode active material layer comprises an active material, a conductive material, and a binder, and wherein the gel polymer electrolyte coating layer comprises a gel polymer which is formed through cross-linking polymerization of an amine-based compound and an epoxy compound.

In this case, the amine-based compound may include two or more amine groups.

Also, the epoxy compound may include two or more epoxy groups.

In addition, the amine-based compound may comprise at least one selected from the group consisting of diethylene triamine (DETA), triethylene tetramine (TETA), methane diamine (MDA), m-xylylene diamine (MXDA), isophoronediamine (IPDA), m-phenylene diamine (MPD), 4,4'-diaminodiphenylmethane (DDM), and 4,4'-diaminodiphenyl sulfone (DDS).

Additionally, the epoxy compound may comprise at least one selected from the group consisting of pentaerythritol tetraglycidyl ether (PETGE), trimethylolpropane triglycidyl ether (TMPTGE), tetraphenylolethane glycidyl ether (TPEGE), triphenylolmethane triglycidyl ether (TPMTGE), trimethylolpropane diglycidyl ether, ethylene glycol diglycidyl ether, propylene glycol diglycidyl ether, diglycidyl ether, triglycidyl ether, N,N-diglycidyl-4-glycidyloxyaniline, 3,4-epoxycyclohexylmethyl-3',4'-epoxycyclohexane carboxylate, and 1,4-butanediol diglycidyl ether.

Also, the gel polymer electrolyte coating layer may have a thickness of 0.1μm to 5μm.

In addition, the gel polymer electrolyte coating layer may include a composition comprising an electrolyte solution solvent and a lithium salt in the gel polymer.

Further, the electrolyte solution solvent may be present in the gel polymer electrolyte coating layer in an amount of 10% by weight to 60% by weight, based on a total weight of the gel polymer electrolyte coating layer.

According to another aspect of the present invention, there is provided a method of manufacturing a cathode for lithium secondary batteries, which comprises:

preparing a gel polymer precursor solution in which an amine-based compound, an epoxy compound, and an electrolyte solution solvent are mixed;

providing a current collector having a cathode active material layer formed on at least one surface thereof, and coating the gel polymer precursor solution on a surface of the cathode active material layer opposite the current collector; and thermally curing the coated gel polymer precursor solution to form a gel polymer electrolyte coating layer.

In this case, the total content of the amine-based compound and the epoxy compound in the gel polymer precursor solution may be in a range of 40 parts by weight to 90 parts by weight, based on a total of 100 parts by weight of the gel polymer precursor solution.

Also, the thermal curing may be performed at a temperature of 25° C. to 90° C.

According to still another aspect of the present invention, there is provided a lithium secondary battery which comprises:

the aforementioned cathode;
an anode arranged opposite to the cathode; and
an electrolyte interposed between the cathode and the anode.

One exemplary embodiment of the present invention is characterized in that cathode comprises sulfur.

Advantageous Effects

The cathode for lithium secondary batteries according to the present invention comprises a gel polymer electrolyte coating layer on a surface of a cathode, and thus can solve the problems caused by lithium polysulfides generated at the cathode of the lithium secondary battery and suppress side reactions with an electrolyte solution.

In the lithium secondary battery provided with the cathode, a decline in capacity of sulfur is not caused. Therefore, the lithium secondary battery makes it possible to realize high-capacity batteries, and has improved battery stability because a high loading amount of sulfur can be stably applied and it has no problems such as short circuitry, heat generation, and the like in batteries. In addition, such a lithium secondary battery has advantages in that the battery has high charge/discharge efficiency and improved lifespan characteristics.

DESCRIPTION OF DRAWINGS

FIG. 1 is an SEM image of a surface of a cathode shown in Comparative Example 1.

FIG. 2 is an SEM image of a surface of a cathode shown in Example 1.

FIG. 3 is an SEM image of a surface of a cathode shown in Example 2.

FIG. 4 is an EDS mapping image of the cathode shown in Example 1.

FIG. 5 is a graph illustrating the charge/discharge efficiency characteristics of lithium secondary batteries manufactured in Examples 1 and 2 and Comparative Example 1.

FIG. 6 is a graph illustrating the lifespan characteristics of the lithium secondary batteries manufactured in Examples 1 and 2 and Comparative Example 1.

FIG. 7 is a reaction scheme showing an epoxy compound reacting with an amine-based compound, in a ring-opening reaction to form a cross-linked polymer.

BEST MODE

Hereinafter, the present invention will be described in further detail.

It should be understood that the terms and words used in this specification and the claims are not to be construed as having common and dictionary meanings but are construed as having meanings and concepts corresponding to the technical spirit of the present invention in view of the principle that the present inventor can properly define the concepts of the terms and words in order to describe his/her invention with the best method.

A lithium secondary battery refers to an electrochemical device that uses materials enabling intercalation/deintercalation of lithium ions as an anode and a cathode, is manufactured by filling an organic electrolyte solution or a polymer electrolyte solution between the anode and the cathode, and generates electrical energy by means of an oxidation/reduction reaction when the lithium ions are intercalated/deintercalated into/from the cathode and anode. According to one exemplary embodiment of the present invention, the lithium secondary battery may be a lithium-sulfur battery comprising 'sulfur' as an electrode active material of the cathode.

Cathode for Lithium Secondary Batteries

A lithium secondary battery has significantly higher discharge capacity and theoretical energy density, compared to the existing lithium secondary batteries, and sulfur used as a cathode active material has emerged as a material for next-generation batteries because it is inexpensive due to its rich deposits and is environmentally friendly.

In spite of such advantages, it does not realize both theoretical capacity and energy density during the actual driving. This is because the ratio of sulfur, which is a cathode active material that practically participates in an electrochemical oxidation/reduction reaction, is very low due to its low lithium ion conductivity. The capacity and efficiency of the lithium secondary battery may vary depending on an amount of lithium ions transferred to the cathode. Therefore, enhancing lithium ion conductivity of the cathode is important to improve the capacity and efficiency of the lithium secondary battery.

In addition, the lithium secondary battery has a shuttle phenomenon in which lithium polysulfides formed at the cathode during a charge/discharge response are lost out of a cathode reaction zone and moves between the cathode and an anode. In this case, as the lithium sulfides are fixed to a surface of a lithium metal that is the anode due to side reactions between the lithium polysulfides eluted from the cathode and the lithium metal, its reaction kinetics may be lowered, and lithium ions may be unnecessarily consumed, resulting in accelerated degradation of the battery efficiency and lifespan.

To improve the lithium ion conductivity, a method of increasing a concentration of a lithium salt in an electrolyte or introducing an additive to an electrolyte or a cathode has been used in the prior art, but the performance and lifespan of the lithium secondary battery was not effectively improved.

Accordingly, according to the present invention, there are provided a cathode for lithium secondary batteries having improved capacity and lifespan characteristics by solving the problems caused by elution of the lithium polysulfides in the existing cathodes for lithium secondary batteries, and a method of manufacturing the same.

Particularly, the cathode for lithium secondary batteries according to the present invention comprises:

a current collector;

a cathode active material layer formed on at least one surface of the current collector; and a gel polymer electrolyte coating layer formed on a surface of the cathode active material layer opposite the current collector, wherein the cathode active material layer comprises an active material, a conductive material, and a binder, and wherein the gel polymer electrolyte coating layer comprises a gel polymer which is formed through cross-linking polymerization of an amine-based compound and an epoxy compound.

In this case, the amine-based compound may have two or more amine groups, and any type of compounds having multiple amine end groups such as diamine, triamine, tetraamine, and the like may be applied as the amine-based compound. Particularly, the amine-based compound may comprise at least one selected from the group consisting of diethylene triamine (DETA), triethylene tetramine (TETA), methane diamine (MDA), m-xylylene diamine (MXDA), isophoronediamine (IPDA), m-phenylene diamine (MPD), 4,4'-diaminodiphenylmethane (DDM), and 4,4'-diaminodiphenyl sulfone (DDS). When the amine-based compound comprises a tertiary amine, the tertiary amine may not form a cross-linked polymer through an addition reaction with an epoxy compound because all active hydrogen atoms in the amine substituted with hydrocarbon group. Also, because the amine-based compound serves as a polymerization catalyst for epoxy compounds, it is improper to form a gel polymer electrolyte coating layer according to the present invention. Therefore, the amine-based compound according to the present invention may be preferably m-xylylene diamine (MXDA) comprising a primary amine. The m-xylylene diamine is cured at room temperature with an aliphatic diamine having an aromatic group, and has a good heat resistance property. The amine-based compound is less pungent or toxic than DETA and TETA, and has a relatively long pot life and a low viscosity. Because, cured products have substantially identical general characteristics, and easily absorb carbon dioxide in the air, attention should be paid to bubbling the cured products upon overheat curing.

The epoxy compound may have two or more epoxy groups, and any type of compounds having multiple epoxy end groups such as diglycidyl ether, triglycidyl ether, tetraglycidyl ether, and the like may be applied as the epoxy compound. Particularly, the epoxy compound may comprise at least one selected from the group consisting of pentaerythritol tetraglycidyl ether (PETGE), trimethylolpropane triglycidyl ether (TMPTGE), tetraphenylolethane glycidyl ether (TPEGE), triphenylolmethane triglycidyl ether (TPMTGE), trimethylolpropane diglycidyl ether, ethylene glycol diglycidyl ether, propylene glycol diglycidyl ether, diglycidyl ether, triglycidyl ether, N,N-diglycidyl-4-glycidyloxyaniline, 3,4-epoxycyclohexylmethyl-3',4'-epoxycyclohexane carboxylate, and 1,4-butanediol diglycidyl ether. Preferably, the epoxy compound may be trimethylolpropane triglycidyl ether (TMPTGE).

An acrylate-based polymer used as the existing cathode protection layer has a drawback in that it is difficult to introduce an acrylate-based compound into an electrode protection layer of a lithium secondary battery through a cross-linking reaction because radical chemical species are generated during a cross-linking reaction and sulfur in the lithium secondary battery serves as a radical scavenger. In the present invention, the present inventors have found a method of forming a polymer coating layer through a cross-linking reaction between an epoxy compound and an amine-based compound as described above, and applied this method to lithium secondary batteries in order to solve these problems. Therefore, the present invention has been completed based on these facts.

A mixing ratio of the amine-based compound and the epoxy compound may be calculated based on the types and equivalents of the amine-based compound and epoxy compound to be blended, and proper ratios of various amine-based compounds and epoxy compounds added may be determined using a method of calculating a mixing volume, as follows.

$$\text{Amount of Amine-based Compound Added (per hundred resins: } PHR\text{)} = \left( \frac{\dfrac{\text{Molecular Weight of Amine-based Compound}}{\text{Number of Active Hydrogen of Amine-based Compound}}}{\dfrac{\text{Molecular Weight of Epoxy Compound}}{\text{Number of Epoxy Groups of Epoxy Compound}}} \right) \times 100 \quad \text{[Equation 1]}$$

The epoxy compound may be ring-opened with an amine-based compound to form a cross-linked polymer. For example, the ring-opening reaction may be as shown in FIG. 7.

Referring the reaction, a cross-linking polymerization occurs in a pattern in which a ring-opening reaction of an epoxide ring is induced by nucleophilic addition of amine groups having active hydrogen. In this case, a gel polymer compound having a network structure comprising a number of cross-linking points may be formed by means of the reaction.

Because lithium polysulfides may be adsorbed by the amine groups in the gel polymer generated by the reaction as described above, the drawbacks of the lithium secondary battery caused by the lithium polysulfides may be solved, and the network structure may be formed to support an electrolyte solution and a lithium salt.

However, because both of the amine-based compound and epoxy compound are strongly reactive with a lithium metal, it is desirable that a gel polymer electrolyte coating layer is formed on a surface of the lithium metal using the compound as a precursor in order to solve the problems caused by the lithium polysulfides. The amine-based compound and the epoxy compound react with the lithium metal to form by-products on the surface of the lithium metal such as lithium-oxide (Li-oxide), lithium-nitride (Li-nitride), and the like, which makes it impossible to use the lithium metal as the anode of the lithium secondary battery.

The gel polymer electrolyte coating layer generated by the cross-linking reaction may have a thickness of 0.1μm to 5μm. When the thickness is less than this thickness range, an effect of improving charge/discharge efficiency and lifespan characteristics of the battery may be insignificant due to a poor lithium polysulfide adsorption effect. On the other hand, when the thickness is greater than this thickness range, efficiency of the battery may be degraded due to the resistance exerted by the coating layer. Therefore, the thickness of the gel polymer electrolyte coating layer is properly adjusted within this thickness range.

According to one exemplary embodiment of the present invention, the gel polymer electrolyte coating layer may be a coating layer comprising an electrolyte dipped in a separator of the lithium secondary battery, and the electrolyte may comprise an electrolyte solution and a lithium salt.

Particularly, the electrolyte solution may be a polar solvent such as an aryl compound, a bicyclic ether, a non-cyclic carbonate, a sulfoxide compound, a lactone compound, a ketone compound, an ester compound, a sulfate compound, a sulfite compound, or the like.

More particularly, the electrolyte solution may comprise 1,2-dimethoxyethane, 1,2-diethoxyethane, 1,2-dibutoxyethane, dioxolane (DOL), 1,4-dioxane, tetrahydrofuran, 2-methyltetrahydrofuran, dimethyl carbonate (DMC), diethyl carbonate (DEC), ethyl methyl carbonate (EMC), methyl propyl carbonate (MPC), ethyl propyl carbonate, dipropyl carbonate, butyl ethyl carbonate, ethyl propanoate (EP), toluene, xylene, dimethyl ether (DME), diethyl ether, triethylene glycol monomethyl ether (TEGME), diglyme, tetraglyme, hexamethyl phosphoric triamide, gamma-butyrolactone (GBL), acetonitrile, propionitrile, ethylene carbonate (EC), propylene carbonate (PC), N-methylpyrrolidone, 3-methyl-2-oxazolidone, acetic acid ester, butyric acid ester and propionic acid ester, dimethylformamide, sulforane (SL), methylsulforane, dimethylacetamide, dimethyl sulfoxide, dimethyl sulfate, ethylene glycol diacetate, dimethylsulfite, or ethylene glycol sulfite. Preferably, the electrolyte solution may be triethylene glycol monomethyl ether (TEGME).

The lithium salt may be used without particular limitation as long as it can provide lithium ions used in the lithium secondary battery. Particularly, $LiPF_6$, $LiClO_4$, $LiAsF_6$, $LiBF_4$, $LiSbF_6$, $LiAlO_4$, $LiAlC_4$, $LiCF_3SO_3$, $LiC_4F_9SO_3$, $LiN(C_2F_5SO_3)_2$, $LiN(C_2F_5SO_2)_2$ (lithium bis(perfluoroethylsulfonyl)imide; BETI), $LiN(CF_3SO_2)_2$ (lithium bis(trifluoromethanesulfonyl)imide; LiTFSI), $LiN(CaF_{2a+1}SO_2)$ $(CbF_{2b+1}SO_2)$ (wherein a and b are natural numbers, preferably 1≤a≤20, and 1≤b≤20), lithium poly[4,4'-(hexafluoroisopropylidene)diphenoxy]sulfonylimide (LiPHFIPSI), LiCl, LiI, $LiB(C_2O_4)_2$, and the like may be used as the lithium salt. Among these, a sulfonyl group-containing imide lithium compound such as LiTFSI, BETI or LiPHFIPSI may be more preferred.

Also, the electrolyte solution solvent may be preferably present in the gel polymer electrolyte coating layer in an amount of 10% by weight to 60% by weight, based on a total weight of the gel polymer electrolyte coating layer. When the content of the electrolyte solution is less than 10% by weight, the performance of the battery may be degraded due to degraded conductivity of lithium ions in the gel polymer electrolyte coating layer. On the other hand, when the content of the electrolyte solution is greater than 60% by weight, a decline in mechanical strength of the gel polymer electrolyte coating layer may be caused.

The cathode for lithium secondary batteries according to the present invention may be manufactured by a method of manufacturing a cathode for lithium secondary batteries, the method comprising:

preparing a gel polymer precursor solution in which an amine-based compound, an epoxy compound, and an electrolyte solution solvent are mixed;

providing a current collector having a cathode active material layer formed on at least one surface thereof, and coating the gel polymer precursor solution on a surface of the cathode active material layer opposite the current collector; and thermally curing the coated gel polymer precursor solution to form a gel polymer electrolyte coating layer.

In this case, the total content of the amine-based compound and the epoxy compound in the gel polymer precursor solution may be in a range of 40 parts by weight to 90 parts by weight, based on a total of 100 parts by weight of the gel polymer precursor solution. When the total content of the amine-based compound and the epoxy compound is less than this content range, it is difficult to form a gel polymer compound, and a decline in mechanical strength of the gel polymer electrolyte coating layer may also be caused. On the other hand, when the total content of the amine-based compound and the epoxy compound is greater than this content range, the performance of the battery may be degraded due to degraded conductivity of lithium ions in the gel polymer. Therefore, the total content of the amine-based compound and the epoxy compound is properly adjusted within this content range.

The coating of the gel polymer precursor solution may be performed using a coating method used in conventional solution processes such as spin coating, spray coating, doctor blade coating, dip coating, and the like.

Next, the coated precursor solution is cured to form a gel polymer.

In this case, the curing may be thermal curing, and the thermal curing may be performed at a temperature of 25° C. to 90° C. When the thermal curing temperature is less than this temperature range, a cross-linking reaction between the amine-based compound and the epoxy compound may not be properly carried out. On the other than, when the thermal curing temperature is greater than this temperature range, sulfur may be volatilized, resulting in degraded capacity of the battery. Therefore, the thermal curing temperature is properly adjusted within this content range.

The gel polymer electrolyte coating layer according to the present invention has an advantage in that a coating layer may be uniformly formed on a surface of an electrode because the electrode is coated with the gel polymer precursor solution and thermally cured, as described above.

Also, the electrolyte solution comprised in the gel polymer precursor solution during the curing process may be impregnated into the gel polymer, and the lithium salt may be contained in the electrolyte solution, which makes it possible to secure the conductivity of lithium ions of the cathode in the lithium secondary battery.

Also, the present invention provides a lithium secondary battery comprising the cathode.

The cathode, the anode, the separator, and the electrolyte solution provided in the lithium secondary battery will be described as follows.

The cathode has a shape in which a cathode active material is stacked on a cathode current collector.

The cathode current collector is not particularly limited as long as it has high conductivity without causing a chemical change in the battery. For example, stainless steel, aluminum, nickel, titanium, or baked carbon may be used as the cathode current collector, or current collectors obtained by treating a surface of aluminium or stainless steel with carbon, nickel, titanium, silver, and the like may also be used.

Elemental sulfur ($S_8$), a sulfur-based compound or a mixture thereof may be used as the cathode active material. In this case, because the sulfur materials do not show electrical conductivity when used alone, the sulfur materials are blended with a conductive material, and applied. Particularly, the sulfur-based compound may be $Li_2S_n$ (n≥1), an organic sulfur compound, or a carbon-sulfur polymer $((C_2S_x)_n$: x=2.5 to 50, and n≥2).

The conductive material is used to further improve the conductivity of the electrode active material. Such a conductive material is not particularly limited as long as it has conductivity without causing a chemical change of the corresponding battery. For example, graphites such as natural graphite, artificial graphite, and the like; carbon blacks such as carbon black, acetylene black, Ketjen black, channel black, furnace black, lamp black, thermal black, and the like; conductive fibers such as carbon fibers, metal fibers, and the like; fluorinated carbon; metal powder such as aluminum and nickel powder, and the like; conductive whiskers such as zinc oxide, potassium titanate, and the like; conductive metal oxides such as titanium oxide, and the like; polyphenylene derivatives, and the like may be used.

The cathode may further comprise binder to facilitate binding between the cathode active material and the conductive material and binding to the current collector. The binder may comprise a thermoplastic resin or a thermosetting resin. For example, polyethylene, polypropylene, polytetrafluoroethylene (PTFE), polyvinylidene difluoride (PVDF), a styrene-butadiene rubber, a tetrafluoroethylene-perfluoro alkyl vinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, an ethylene-acrylic acid copolymer, and the like may be used alone or in combination thereof, but the present invention is not particularly limited thereto. In this case, any types of compounds may be used as long as they can be used as the binder in the related art.

Such a cathode may be manufactured according to conventional methods. Particularly, the cathode may be manufactured by mixing a conductive material and a binder with a cathode active material in an organic solvent or water to prepare a composition for forming a cathode active material layer, coating a current collector with the composition, drying the current collector, and optionally compression-molding the current collector in order to improve the electrode density. In this case, solvents that may uniformly disperse the cathode active material, the binder and the conductive material and may be easily evaporated may be preferably used as the organic solvent. Particularly, the organic solvent may comprise acetonitrile, methanol, ethanol, tetrahydrofuran, isopropyl alcohol, and the like.

The anode may comprise an anode current collector, and an anode active material disposed on the anode current collector. Alternatively, the anode may be a lithium metal plate.

The anode current collector serves to support the anode active material, and is not particularly limited as long as it has excellent conductivity and is electrochemically stable in a voltage region of the lithium secondary battery. For example, copper, stainless steel, aluminum, nickel, titanium, palladium, baked carbon, copper or stainless steel whose surface is treated by carbon, nickel, titanium, silver and the like, an aluminum-cadmium alloy, and the like may be used.

The anode current collector may have fine unevenness formed on a surface thereof to enforce a binding force to the anode active material, and may be used in various shapes such as films, sheets, foil, meshes, nets, porous bodies, foams, non-woven fabrics, and the like.

The anode active material may comprise a material enabling reversible intercalation or deintercalation of lithium ions ($Li^+$), a material capable of reacting with lithium ions to reversibly form a lithium-containing compound, a lithium metal, or a lithium alloy. For example, the material enabling reversible intercalation or deintercalation of lithium ions ($Li^+$) may be crystalline carbon, amorphous carbon, or a mixture thereof. For example, the material capable of reacting with lithium ions ($Li^+$) to reversibly form a lithium-containing compound may be tin oxide, titanium nitrate, or silicone. For example, the lithium alloy may be an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn). Preferably, the anode active material may be a lithium metal. Particularly, the anode active material may be in the form of a lithium metal thin film or a lithium metal powder.

A method of forming the anode active material is not particularly limited, and methods of forming a layer or a film generally used in the art may be used. For example, methods such as compression, coating, deposition, and the like may be used. Also, after a battery is assembled without a lithium thin film provided in the current collector, a metal lithium thin film may then be formed on a metal plate through the initial charge. In this case, the metal lithium thin film is comprised in the anode of the present invention.

The separator serves to physically separate both electrodes in the lithium secondary battery of the present invention. In this case, separators may be used without particular limitation as long as they are commonly used as the separator in the lithium secondary battery. In particular, a separator which shows low resistance to migration of ions in an electrolyte and also has an excellent ability to hold moisture in the electrolyte solution is preferred.

The separator may consist of a porous substrate. In this case, all types of porous substrates generally used in electrochemical devices may be used as the porous substrate. For example, a polyolefin-based porous film or a non-woven fabric may be used, but the present invention is not particularly limited thereto.

Examples of the polyolefin-based porous film may comprise membranes formed with polymers in which polyolefin-based polymers such as polyethylenes (for example, high-density polyethylenes, linear low-density polyethylenes, low-density polyethylenes, ultrahigh molecular weight polyethylenes, etc.), polypropylenes, polybutylenes, polypentenes, and the like are used alone or in a mixture thereof.

In addition to the polyolefin-based non-woven fabrics, the non-woven fabrics may, for example, comprises non-woven fabrics formed with polymers in which polyester such as polyethylene terephthalate, polybutylene terephthalate and polyethylene naphthalate, polyacetal, polyamide, polycarbonate, polyimide, polyether ether ketone, polyether sulfone, polyphenylene oxide, and polyphenylene sulfide are used alone or in a mixture thereof. A structure of the non-woven fabrics may be spunbond non-woven fabrics or melt-blown non-woven fabrics, both of which are composed of long fibers.

The thickness of the porous substrate is not particularly limited, but may be in a range of 1μm to 100μm, preferably 5μm to 50μm.

Also, the size and porosity of pores present in the porous substrate are not particularly limited, but may be in a range of 0.001μm to 50μm and 10 to 95%, respectively.

The electrolyte solution of the lithium secondary battery may be composed of an organic solvent electrolyte solution and a lithium salt, and may also comprise an organic solid electrolyte or an inorganic solid electrolyte, but the present invention is not limited thereto.

A non-aqueous organic solvent may, for example, comprise 1,2-dimethoxyethane, 1,2-diethoxyethane, 1,2-dibutoxyethane, dioxolane (DOL), 1,4-dioxane, tetrahydrofuran, 2-methyltetrahydrofuran, dimethyl carbonate (DMC), diethyl carbonate (DEC), ethyl methyl carbonate (EMC), methyl propyl carbonate (MPC), ethyl propyl carbonate, dipropyl carbonate, butyl ethyl carbonate, ethyl propanoate (EP), toluene, xylene, dimethyl ether (DME), diethyl ether, triethylene glycol monomethyl ether (TEGME), diglyme, tetraglyme, hexamethyl phosphoric triamide, gamma-butyrolactone (GBL), acetonitrile, propionitrile, ethylene carbonate (EC), propylene carbonate (PC), N-methylpyrrolidone, 3-methyl-2-oxazolidone, acetic acid ester, butyric acid ester and propionic acid ester, dimethylformamide, sulforane (SL), methylsulforane, dimethylacetamide, dimethyl sulfoxide, dimethyl sulfate, ethylene glycol diacetate, dimethylsulfite, or ethylene glycol sulfite. Preferably, the non-aqueous organic solvent may be triethylene glycol monomethyl ether (TEGME).

The lithium salt is a compound that is easily dissolved in the non-aqueous electrolyte. For example, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$ (lithium bis(perfluoroethylsulfonyl)imide; BETI), $LiN(CF_3SO_2)_2$ (lithium bis(trifluoromethanesulfonyl)imide; LiTFSI), $LiN(CaF_{2a+1}SO_2)(C_bF_{2b+1}SO_2)$ (where a and b are natural numbers, preferably 1≤a≤20, and 1≤b≤20), lithium poly[4,4'-(hexafluoroisopropylidene)diphenoxy]sulfonylimide (LiPHFIPSI), LiCl, LiI, $LiB(C_2O_4)_2$, and the like may be used. Among these, a sulfonyl group-containing imide lithium compound such as LiTFSI, BETI or LiPHFIPSI may also be more preferred.

A shape of the lithium secondary battery as described above is not particularly limited, and may, for example, be in the form of a jelly roll type, a stack type, a stack-folding type (comprising a stack-Z-folding type), or lamination-stack type. Preferably, the shape of the lithium secondary battery may be in a stack-folding type.

A lithium secondary battery is manufactured by manufacturing this electrode assembly in which the cathode, the separator, and the anode are sequentially stacked, putting the electrode assembly into a battery case, injecting an electrolyte solution into an upper portion of the case, and dealing the case with a gap plate and a gasket to complete the assembly.

The lithium secondary batteries may be divided into cylindrical, angulate, coin-type, pouch-type lithium secondary batteries, depending on the shapes thereof, and may also be divided into bulk-type and thin film-type lithium secondary batteries, depending on the sizes thereof. The structures of these batteries and methods of manufacturing the same are widely known in the art, and a detailed description thereof is omitted.

The lithium secondary battery according to the present invention is a high-capacity and high-load battery that may be used as a power source for devices requiring these characteristics. Specific examples of the devices may comprise power tools that are powered by electrical motors; electric cars comprising electric vehicles (EVs), hybrid electric vehicles (HEVs), plug-in hybrid electric vehicles (PHEVs), and the like; electric two-wheeled vehicles comprising electric bikes (E-bikes) and electric scooters (E-scooters); electric golf carts; power storage systems, and the like, but the present invention is not limited thereto.

Mode for Invention

Hereinafter, examples, comparative examples and experimental examples are given to aid in understanding the present invention. However, it should be understood that the following description is given with respect to the contents and effects of the present invention, but is not intended to limit the scope and effects of the present invention.

EXAMPLES

Example 1

(1) Manufacture of Cathode

First of all, sulfur (average particle size: 40μm) was heated with carbon nanotubes (CNT) at a temperature of 155° C. for 30 minutes to prepare a sulfur-carbon complex. The prepared complex, a conductive material and a binder were mixed using a mixer to prepare a composition for forming a cathode active material layer in the form of slurry. In this case, carbon black and SBR were used as the conductive material and the binder, respectively. The mixing ratio was adjusted so that the sulfur-carbon complex, the conductive material and the binder were present at a weight ratio of 88:5:7. An aluminum current collector was coated with the prepared composition for forming a cathode active material layer, and dried to manufacture a cathode.

To prepare a gel polymer precursor solution in a room-temperature dry room or a glove box kept under an inert gas atmosphere, 0.69 g of trimethylolpropane triglycidyl ether (TMPTGE) and 0.31 g of m-xylene diamine (m-XDA) serving as precursors, and 1 g of a 1 M LiTFSI solution prepared by mixing LiTFSI as a lithium salt with electrolyte solution solvent tetraethylene glycol dimethyl ether (TEGDME) were added to an ethanol solvent to prepare a 5% precursor solution.

The cathode prepared in advance was supported in the resulting precursor solution, and then thermally cured at a temperature of 80° C. for 4 hours to prepare a cathode for lithium secondary batteries into which a gel polymer coating layer, more particularly an epoxy gel polymer electrolyte (EGPE) coating layer was introduced.

(2) Manufacture of Lithium Secondary Battery

As the anode, lithium foil having a thickness of approximately 40μm were arranged with the cathode on which the gel polymer electrolyte coating layer was formed to face each other, and a polyethylene separator was then interposed between the cathode and the anode, and an electrolyte composed of TEGDME/DOL (dioxolane)/DME (dimethyl ether) (1:1:1), 1 M LiN(CF$_3$SO$_2$)$_2$ (LiTFSI), and 0.1 M LiNO$_3$ was injected to manufacture an electrode assembly. The electrode assembly was accommodated into a battery case to manufacture a coin cell for lithium secondary batteries.

FIG. 2 shows an SEM image of a surface of the cathode on which the gel polymer electrolyte coating layer prepared in Example 1 was formed. FIG. 4 shows the analysis results of elements in the cathode, that is, the energy dispersive spectrometer (EDS) mapping image results. Referring to FIG. 4, it was confirmed that elemental fluorine (F) derived from the lithium salt (i.e., LiTFSI) comprised in the gel polymer electrolyte coating layer that was the lithium ion conductivity polymer according to the present invention was generally detected on a surface of the cathode. Therefore, it was confirmed that the cathode comprising the cathode active material layer was uniformly coated with the gel polymer according to the present invention.

EXAMPLE 2

A lithium secondary battery was manufactured in the same manner as in Example 1, except that a 10% gel polymer precursor solution was used.

FIG. 3 shows an SEM image of a surface of the cathode on which the gel polymer electrolyte coating layer prepared in Example 2 was formed.

Comparative Example 1

A lithium secondary battery was manufactured in the same manner as in Example 1, except that a cathode into which the gel polymer electrolyte coating layer was not introduced was used.

FIG. 1 shows an SEM image of a surface of the cathode into which the gel polymer electrolyte coating layer prepared in Comparative Example 1 was not introduced. Referring to FIGS. 1 to 3 together, it was confirmed that there were no changes in shapes of the surfaces of the cathodes before and after the introduction of the gel polymer electrolyte coating layer according to the present invention. As a result, it can be seen that the physical properties of the cathodes manufactured in Examples 1 and 2 were not much different from those of the cathode manufactured in Comparative Example 1.

Experimental Example 1

The lithium secondary batteries manufactured in examples and comparative examples were driven under 0.3 C/0.5 C charging/discharging conditions, the initial charge/discharge capacities were measured, and then charged/discharged for 60 cycles to determine a change in capacity.

FIG. 5 is a graph illustrating the charge/discharge capacities of the lithium secondary batteries manufactured in Examples 1 and 2 and Comparative Example 1. Referring to FIG. 5, it can be seen that the batteries of Examples 1 and 2 having the coating layer according to the present invention has an initial discharge capacity similar to those of the lithium secondary battery of Comparative Example 1 having no coating layer.

FIG. 6 is a graph illustrating the lifespan characteristics of the lithium secondary batteries manufactured in Examples 1 and 2 and Comparative Example 1. Referring to FIG. 6, it can be seen that the batteries of Examples 1 and 2 had excellent lifespan characteristics compared to the lithium secondary battery of Comparative Example 1 because the batteries of Examples 1 and 2 showed a high capacity maintenance rate with respect to the initial charge/discharge efficiency and improved Coulombic efficiency, and had a capacity improvement effect.

From these results, it can be seen that the lithium secondary battery had high initial charge/discharge capacity characteristics and excellent lifespan characteristics because the lithium polysulfides were adsorbed due to the gel polymer electrolyte coating layer provided in the present invention when the lithium secondary battery was driven.

The invention claimed is:

1. A cathode for lithium-sulfur batteries comprising:
a current collector;
a cathode active material layer formed on at least one surface of the current collector; and
a gel polymer electrolyte coating layer formed on a surface of the cathode active material layer opposite the current collector,
wherein the cathode active material layer comprises an active material, a conductive material, and a binder, and
wherein the gel polymer electrolyte coating layer comprises a gel polymer which is formed through cross-linking polymerization of an amine-based compound and an epoxy compound,
wherein the cathode active material layer comprises sulfur, and
wherein the amine-based compound comprises two or more primary amine groups and aromatic group.

2. The cathode for lithium-sulfur batteries according to claim 1, wherein the epoxy compound comprises two or more epoxy groups.

3. The cathode for lithium-sulfur batteries according to claim 1, wherein the amine-based compound comprises at least one selected from the group consisting of m-xylylene diamine (MXDA), m-phenylene diamine (MPD), 4,4'-diaminodiphenylmethane (DDM), and 4,4'-diaminodiphenyl sulfone (DDS).

4. The cathode for lithium-sulfur batteries according to claim 1, wherein the epoxy compound comprises at least one selected from the group consisting of pentaerythritol tetraglycidyl ether (PETGE), trimethylolpropane triglycidyl ether (TMPTGE), tetraphenylolethane glycidyl ether (TPEGE), triphenylolmethane triglycidyl ether (TPMTGE), trimethylolpropane diglycidyl ether, ethylene glycol diglycidyl ether, propylene glycol diglycidyl ether, diglycidyl ether, triglycidyl ether, N,N-diglycidyl-4-glycidyloxyaniline, 3,4-epoxycyclohexylmethyl-3',4'-epoxycyclohexane carboxylate, and 1,4-butanediol diglycidyl ether.

5. The cathode for lithium-sulfur batteries according to claim 1, wherein the gel polymer electrolyte coating layer has a thickness of 0.1 μm to 5 μm.

6. The cathode for lithium-sulfur batteries according to claim 1, wherein the gel polymer electrolyte coating layer comprises a composition comprising an electrolyte solution solvent and a lithium salt in the gel polymer.

7. The cathode for lithium-sulfur batteries according to claim 6, wherein the electrolyte solution solvent is present in the gel polymer electrolyte coating layer in an amount of 10% by weight to 60% by weight, based on a total weight of the gel polymer electrolyte coating layer.

8. A method of manufacturing a cathode for lithium-sulfur batteries according to claim 1, comprising: preparing a gel polymer precursor solution in which the amine-based compound, the epoxy compound, and an electrolyte solution solvent are mixed; providing the current collector having the cathode active material layer formed on at least one surface thereof, and coating the gel polymer precursor solution on the surface of the cathode active material layer opposite the current collector; and thermally curing the coated gel polymer precursor solution to form the gel polymer electrolyte coating layer.

9. The method according to claim 8, wherein total content of the amine-based compound and the epoxy compound in the gel polymer precursor solution is in a range of 40 parts by weight to 90 parts by weight, based on a total of 100 parts by weight of the gel polymer precursor solution.

10. The method according to claim 8, wherein the thermal curing is performed at a temperature of 25° C. to 90° C.

11. A lithium-sulfur battery comprising:
the cathode defined in claim 1;
an anode arranged opposite to the cathode; and
an electrolyte interposed between the cathode and the anode.

* * * * *